(12) United States Patent
Enyedy et al.

(10) Patent No.: US 7,408,756 B2
(45) Date of Patent: Aug. 5, 2008

(54) ELECTRO MECHANICAL CONTACTOR DEVICE FOR WELDING WIRE FEEDER

(75) Inventors: Edward A. Enyedy, Eastlake, OH (US); Kenneth L. Justice, Wickliffe, OH (US)

(73) Assignee: Lincoln Global, Inc., City of Industry, CA (US)

( * ) Notice: Subject to any disclaimer, the term of this patent is extended or adjusted under 35 U.S.C. 154(b) by 190 days.

(21) Appl. No.: 11/049,092

(22) Filed: Feb. 3, 2005

(65) Prior Publication Data
US 2006/0171090 A1   Aug. 3, 2006

(51) Int. Cl.
*H02H 5/00* (2006.01)
(52) U.S. Cl. ..................................................... 361/103
(58) Field of Classification Search .................. 361/103
See application file for complete search history.

(56) References Cited

U.S. PATENT DOCUMENTS

| | | | | |
|---|---|---|---|---|
| 3,740,518 A | * | 6/1973 | Berghof | 219/50 |
| 3,829,652 A | * | 8/1974 | Terry | 219/133 |
| 4,470,711 A | * | 9/1984 | Brzozowski | 374/179 |
| 4,876,625 A | * | 10/1989 | Wolfe | 361/93.5 |
| 5,410,126 A | * | 4/1995 | Miller et al. | 219/130.1 |
| 5,821,491 A | * | 10/1998 | Dew et al. | 219/108 |
| 6,265,701 B1 | * | 7/2001 | Bickel et al. | 219/617 |
| 6,399,912 B1 | * | 6/2002 | Steenis et al. | 219/73.2 |
| 2002/0135237 A1 | * | 9/2002 | Baker | 307/115 |
| 2004/0089645 A1 | | 5/2004 | Saccon | 219/130.21 |

* cited by examiner

*Primary Examiner*—Stephen W Jackson
(74) *Attorney, Agent, or Firm*—Fay Sharpe LLP

(57) ABSTRACT

An electro mechanical contactor device in a wire feeder for an electric arc welder having a power source and a gun with a contact tip through which welding wire is fed and a weld cycle start trigger switch having a closed condition to initiate and hold a weld cycle and an open condition. The contactor device comprises a power inlet lead connected to the power source, an output lead connected to the contactor tip, a plurality of current branches between the input lead and the output lead with a mechanical contactor having an open condition and closed condition for opening and closing each of the branches. A single solenoid operating the contactors in unison based upon the condition of the trigger switch, with a first position to close the contactors in unison when said trigger switch is shifted from the open condition to the closed condition and to hold the contactors closed when the trigger switch is in the closed condition.

17 Claims, 3 Drawing Sheets

ELECTRO MECHANICAL CONTACTOR DEVICE FOR WELDING WIRE FEEDER

The present invention relates to the art of electric arc welding and more particularly to an improved electro mechanical contactor device for use in a wire feeder.

INCORPORATION BY REFERENCE

The electro mechanical contactor device of the present invention is employed to overcome the disadvantage discussed in Patent Application Publication US 2004/0089645, published on May 13, 2004. This publication is incorporated by reference herein as background information to explain the deficiency of the prior art regarding contactors in the wire feeder of an electric arc welder.

BACKGROUND OF INVENTION

In an electric arc welder, an electro mechanical contactor or switch is used to direct welding power from the power source to the contact tip of the welding gun. The electro mechanical contactor relies upon mechanical contacts to turn the welding current on and off; consequently, arcing at the contacts leads to degeneration of contactor performance. The degeneration of performance is exhibited as an increased contact resistance that causes an equal decrease in output power. With continued use of degraded mechanical contacts, the contactor will ultimately overheat. Such deteriorating contactors must be replaced prior to ultimate failure. If the contactor fails during an actual welding operation, the weld performed during the welding cycle may require extensive rewelding or other corrective measures.

Since the commonly used electro mechanical contactor includes a single contactor operated by a solenoid responsive to the position of the weld trigger of the welding gun, a suggested, but not prior art, solution to the overheating of the mechanical contacts is to provide two current branches in the wire feeder. Two sets of contacts are each operated by a solenoid. This suggested solution to the problem of contactor overheating was ineffective. One of the contacts would become overheated thereby driving more current into the other contactor causing it to overheat rapidly. This unbalance of current was caused by the dynamics of the two solenoids operated in unison by the signal from the welding trigger. The concept of providing two separate branches with individual sets of mechanical contacts operated by a dedicated solenoid proved to be no better than the existing mechanical contact or device. The attempt to solve the deficiency merely increased the cost of the contactor device. For that reason, this suggestion was not implemented in the welding industry. The industry turned to the concept disclosed in publication US 2004/0089645, incorporated by reference herein. A solid state circuit was used to prevent overheating and deterioration of the contactor in the wire feeder. When a solid state switch is employed, there is no contact created arcing. Furthermore, there is no mechanical contacts to wear. But, the conduction resistance of the solid state switch is substantially higher than the normal contact resistance of closed mechanical contacts. Indeed, the resistance of a solid state switch is often in the general range of 0.50 ohms or greater. Since an electric arc welder often operates at current of over 300 amperes, a substantial amount of heat energy is generated at the solid state switch or switches. This generated heat must be dissipated in the wire feeder cabinet. Internal heat dissipation is challenging for wire feeders requiring generally sealed cabinets, especially when used in the field. Thus, the solid state switch approach is costly and not completely satisfactory.

THE INVENTION

The present invention involves the use of a contactor device for a wire feeder. The device employs a single solenoid coil having two or more sets of mechanical contacts so that a single solenoid operates the plurality of contact sets to distribute current uniformly between the separate contacts. A dual mechanical contact device with single solenoid is on the market, but has never been used in an arc welder. One such device can be purchased from Curtis Albright and is used in the preferred embodiment of the invention.

In accordance with the invention, there is provided an electro mechanical contactor device in a wire feeder for an electric welder having a power source and a gun with a contact tip through which welding wire is fed and a weld cycle start trigger switch having a closed condition to initiate and hold a welding cycle and an open condition. The contactor device of the present invention comprises an inlet lead connected to the power source, an output lead connected to the contact tip of the gun, a plurality of parallel current branches between the input lead and the output lead. A set of mechanical contacts each having an open condition and a closed condition control current in each of the branches. A single solenoid is used to operate the plurality of contact sets in unison based upon the condition of the trigger switch. The trigger switch has a first position to close the contacts in unison when the trigger switch is closed. In this first position, the trigger switch holds the contactor closed as long as the trigger switch is in the closed condition. By using this invention, the plurality of contact sets is operated in unison. They are opened and closed at the exact time so the current through the parallel branches is evenly divided between the two branches at the instant the two branches are opened. Thus, there is reduced current to create arcing at the various mechanical contacts. In practice, two parallel branches are used in the novel electro mechanical contactor device.

The primary object of the present invention is the provision of electro mechanical contactor device for the wire feeder of an electric arc welder, which device reduces the arcing current as the contactor device is shifted from welding to non-welding.

Another object of the present invention is the provision of a device, as defined above, which device is low cost and easily implemented with commercial components.

These and other objects and advantages will become apparent from the following description taken together with the accompanying drawings.

PREFERRED EMBODIMENT

Figure 1:
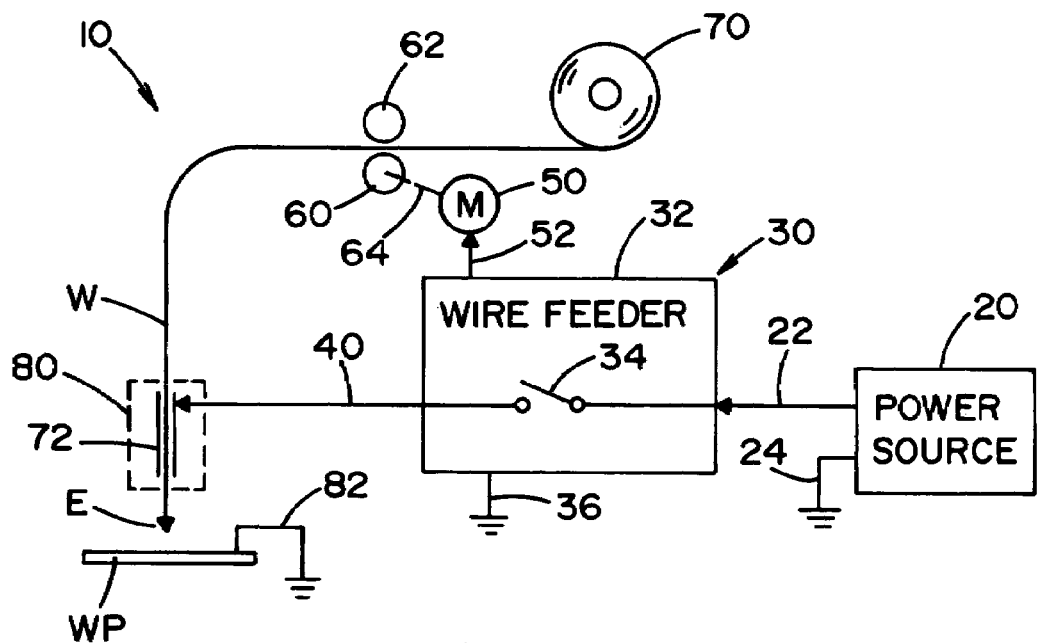
FIGS. 1 and 2 are schematic diagrams illustrating prior art electro mechanical contactors in wire feeders of electric arc welders.

In the welding industry, a common product is an arc welder 10, as shown in FIG. 1 and schematically illustrated as including power source 20 with leads 22, 24. Wire feeder 30 enclosed in cabinet 32 has an internal electro mechanical contactor 34 and a common ground 36. The wire feeder has an output welding lead 40 and a motor 50 operated at a speed determined by the signal on control line 52 from an internal microprocessor of the wire feeder. Motor 50 drives feed rolls 60, 62 through a shaft 64 to pull welding wire W from a supply, illustrated as reel or spool 70. The welding wire is moved through an electrical contact tip 72 located in welding gun 80 to direct electrode E toward workpiece WP for performing an electric arc welding process. The electrical circuit is completed by ground lead 82 attached to workpiece WP, in accordance with standard welding technology. In operation, contactor 34 is closed when a trigger switch within gun 80 is closed by an operator to drive wire W into the welding operation as welding power is directed to the contact tip. The illustration in FIG. 1 constitutes a standard welder having a wire feeder with an internal electro mechanical contactor 34 operated by a solenoid in response to the position of the trigger switch associated with gun 80. As contactor 34 is opened, to disrupt the flow of welding current, an arc is created that tends to erode the mechanical contacts forming contactor 34. This causes overheating and ultimate deterioration of the contactor necessitating replacement of a contactor. This event causes down time and increased equipment costs. Operation of switch 34 is accomplished by the components illustrated in FIG. 2 where trigger switch 100 associated with gun 80 closes solenoid 102 for creating a current flow in coil 104 to pull driver 106 downwardly for closing contactor 34. Solenoid 102 has input voltage at line 108 and ground 110 for establishing flow through coil 104 whenever switch 100 is closed. A welding cycle is started by closing trigger switch 100. This starts motor 50 and closes contactor 34. It has been found that the electro mechanical contactor device illustrated in FIGS. 1 and 2 has the operating deficiencies so far explained.

Figure 2:
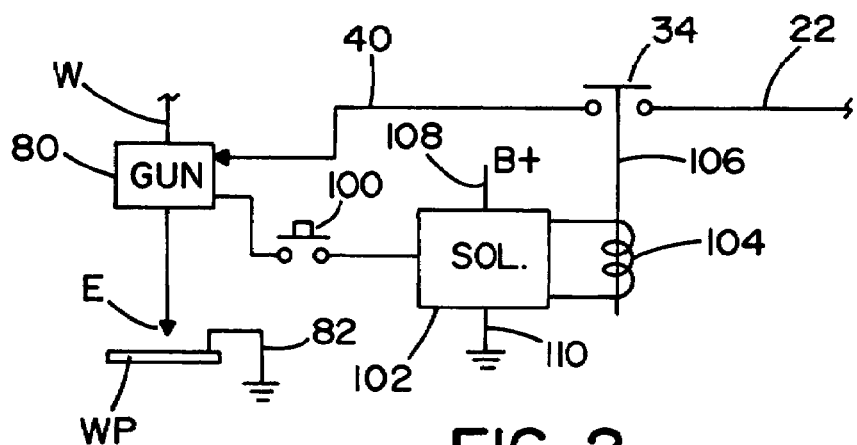
Figure 3:
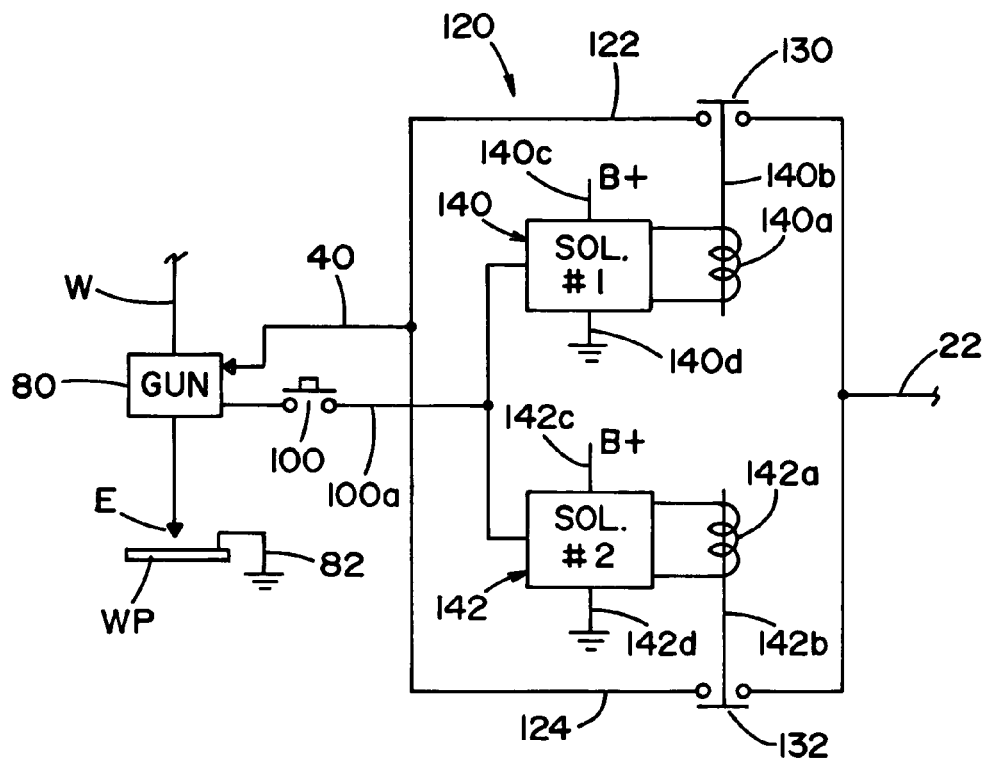
FIG. 3 is a schematic diagram of a suggested design to improve the prior art of FIGS. 1 and 2.
Figure 4A:
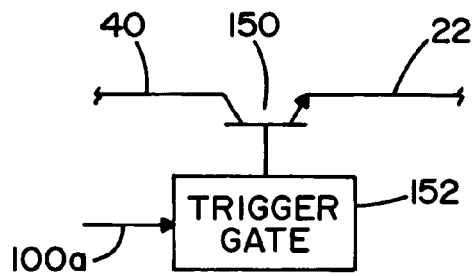
FIG. 4A is a prior art device showing a solid state switch to replace the mechanical switch as shown in FIGS. 1 and 2.
Figure 4B:
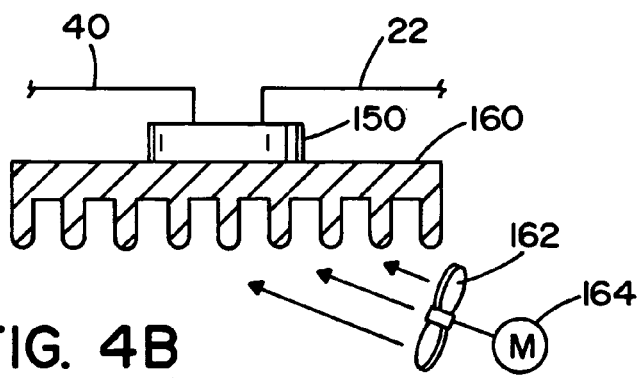
FIG. 4B is a schematic illustration of a heat sink used with the solid state switch shown in FIG. 4A.

In an effort to overcome the deficiencies associated with electro mechanical contactors 34 as shown in FIGS. 1 and 2, it has been suggested to employ a modified device, as shown in FIG. 3. Electro mechanical contactor device 120 has two parallel branches, 122, 124 between power lead 22 and output lead 40. Mechanical contactors 130, 132 in branches 122, 124, respectively, are operated by dedicated solenoids 140, 142. The two solenoids include coils 140a, 142a, drivers 140b, 142b, input leads 140c, 142c and ground terminals 140d, 142d. Suggested device 120 uses solenoids 140, 142 for closing contactors 130, 132 when trigger 100 is closed to create a signal in lead 100a. This signal is from a power supply not shown. This suggested device does not overcome the disadvantages associated with standard commercial device shown in FIGS. 1 and 2. When one of the contactors 130, 132 is opened, current is directed to the other contactor in the opposite parallel branches. Thus, the second contactor opens is under full current as in the prior art. This suggestion is not a solution to the problem; therefore, the circuit shown in publication US 2004/0089645 has been used as a solution to the mechanical wearing deficiencies of the prior art device shown in FIGS. 1 and 2. This improvement involves the use of a solid state switch, schematically illustrated as switch 150 in FIG. 4A. This switch is closed by gate circuit 152 operated by closing trigger 100, as shown in FIGS. 1-3. Since switch 150 has a small resistance inserted between lead 22 and lead 40, it is normally necessary to use a heat sink, such as heat sink 160 shown in FIG. 4B. In practice, this heat sink is cooled by a dedicated fan 162 operated by motor 164. The solid state switch modification is an expensive approach to solving the problem of contactor arcing and requires a substantial change in the wire feeder control as illustrated in the prior publication. Thus, the solid state switch and its control circuitry is not a satisfactory prior art solution and it is not normally applicable for high production, low cost wire feeders.

In accordance with the present invention, an electro mechanical contactor device is still used for the wire feeder. This maintains low cost and low technology while solving the disruptive fast deterioration phenomena of mechanical contactors. Device 200 is low cost, easily used in existing wire feeders and does not require substantial modification, as involved in the complicated device illustrated in FIGS. 4A and 4B. Novel device 200 includes a plurality of parallel branches 202, 204 and 206. In practice, two branches 202 and 204 are used. A mechanical contactor is provided for each of the parallel branches between power lead 22 and output lead 40. In the illustrated embodiment contactors 220, 222 and 224 are used in branches 202, 204 and 206, respectively. A gang mounted driver 230 operates all contactors 220, 222 and 224 in exact unison, since it is driven by a single solenoid 240. Solenoid 240 has an operating coil 242, input lead 244 and ground lead 246. A signal in line 100a operates solenoid 240 to close contactors 220, 222 and 224 in exact unison. Thus, opening of the contactors involves current having a value determined by the number of branches between leads 22 and 40. Contactor device 200 has been found to reduce the wear of the mechanical contacts of the contactors and solve the problems solved in the past only by use of high cost solid state switches and complex control circuitry.

Figure 5:
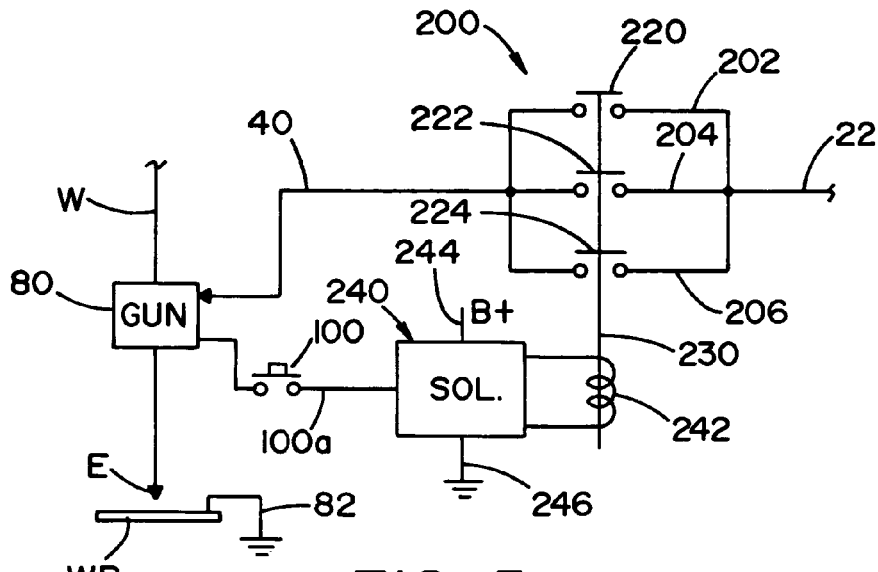
FIG. 5 is a wiring diagram illustrating the preferred embodiment of the present invention.
Figure 6:
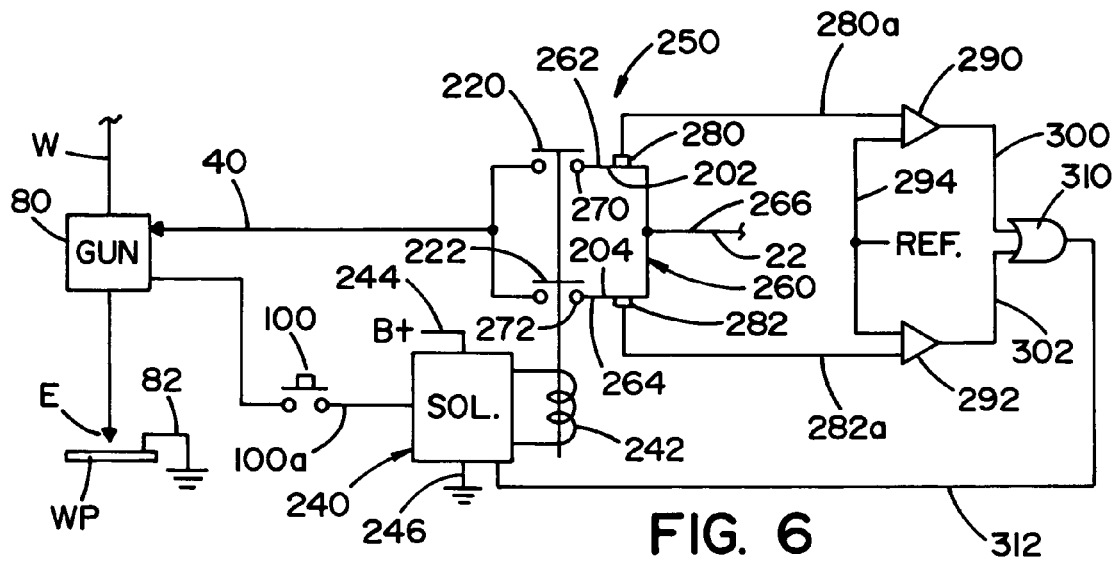
FIG. 6 is a wiring diagram illustrating a further feature added to the preferred embodiment of the present invention; and, FIG. 6A is a pictorial view of a portion of the mechanical contacts on the power side of the embodiment of the invention illustrated in FIG. 6.
Figure 6A:
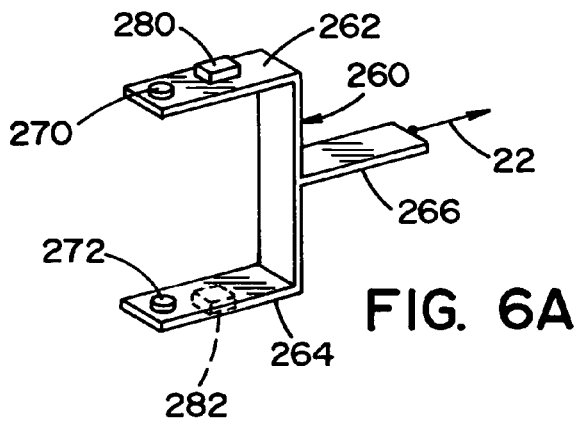

A further improvement in device 200 is illustrated in FIGS. 6 and 6A wherein device 250 has operating characteristics and the same components as identified by like numbers in device 200. However, device 250 has a thermal protective feature. The input to parallel branches 202, 204 is shown as strap 260 having parallel legs 262, 264 and input bar 266 connected to power input lead 22. This type of flat metal strap is used at the output side of the contactor and is used in the other embodiments illustrated in FIGS. 3 and 5. Mechanical contacts 270, 272 are mounted on legs 262, 264 of strap 260. Also mounted on these legs are thermal sensors 280, 282 in the form of thermostats. The output of these thermostats control the signal level on leads 280a, 282a. These leads form one input of comparators 290, 292 for comparing the level of signal on lines 280a, 282a with a reference signal in line 294. When the signal in line 280a is greater than the adjusted reference line 294, comparator 290 creates a logic signal in line 300. In a like manner, comparator 292 creates a logic signal in line 302 when the signal on line 282a is greater than the reference value or signal in line 294. These two output signals 300, 302 are the logic inputs of NAND gate 310. A logic signal on either of these inputs creates an inhibit signal in line 312 to inhibit solenoid 240 whenever the heat of branch 220 or the heat of branch 222 exceeds an acceptable value. In this manner, device 250 has a heat protective feature added to device 200, as shown in FIG. 5.

Having thus defined the invention, the following is claimed:

1. An electro mechanical contactor device in a wire feeder for an electric arc welder having a power source and a gun with a contact tip through which welding wire is fed and a weld cycle start trigger switch having a closed condition to initiate and hold a weld cycle and an open condition, said contactor device comprising: a power inlet lead connected to said power source, an output lead connected to said contact tip, a plurality of current branches between said input lead and said output lead with a mechanical contactor having an open condition and closed condition for opening and closing each of said branches, respectively, and a single solenoid operating said contactors in unison based upon the condition of said trigger switch, with a first position to close said contactors in unison when said trigger switch is shifted from said open condition to said closed condition and to hold said contactors closed when said trigger switch is in said closed condition;

said contactor device further including a temperature sensor associated with each of said branches, said sensor including a circuit to create a signal when the temperature of said branch exceeds a preset value and a circuit for blocking said solenoid from shifting to said first position upon creation of said signal.

2. An electro mechanical contactor device as defined in claim 1 wherein said preset value is essentially the same for each of said branches.

3. An electro mechanical contactor device in a wire feeder for an electric arc welder having a power source and a gun with a contact tip through which welding wire is fed and a weld cycle start trigger switch having a closed condition to initiate and hold a weld cycle and an open condition, said contactor device comprising: a power inlet lead connected to said power source, an output lead connected to said contact tip, a plurality of current branches between said input lead and said output lead with a mechanical contactor having an open condition and closed condition for opening and closing each of said branches, respectively, and a single solenoid operating said contactors in unison based upon the condition of said trigger switch, with a first position to close said contactors in unison when said trigger switch is shifted from said open condition to said closed condition and to hold said contactors closed when said trigger switch is in said closed condition;

wherein said contactor device comprises more than two current branches between said input lead and said output lead; and wherein said contactor device includes a temperature sensor associated with each of said branches, said sensor including a circuit to create a signal when the temperature of said branch exceeds a preset value and a circuit for blocking said solenoid from shifting to said first position upon creation of said signal.

4. An electro mechanical contactor device as defined in claim 3 wherein preset value is essentially the same for each of said branches.

5. An electro mechanical device as defined in claim 4 including a generally sealed cabinet for said wire feeder and means for mounting said device in said generally sealed cabinet.

6. An electro mechanical device as defined in claim 3 including a generally sealed cabinet for said wire feeder and means for mounting said device in said generally sealed cabinet.

7. An electro mechanical device as defined in claim 2 including a generally sealed cabinet for said wire feeder and means for mounting said device in said generally sealed cabinet.

8. An electro mechanical device as defined in claim 1 including a generally sealed cabinet for said wire feeder and means for mounting said device in said generally sealed cabinet.

9. An electro mechanical contactor device in a wire feeder for an electric arc welder having a power source and a gun with a contact tip through which welding wire is fed and a weld cycle start trigger switch having a closed condition to initiate and hold a weld cycle and an open condition, said contactor device comprising: a power inlet lead connected to said power source, an output lead connected to said contact tip, a plurality of current branches between said input lead and said output lead with a mechanical contactor having an open condition and closed condition for opening and closing each of said branches, respectively, and a single solenoid operating said contactors in unison based upon the condition of said trigger switch, with a first position to close said contactors in unison when said trigger switch is shifted from said open condition to said closed condition and to hold said contactors closed when said trigger switch is in said closed condition;

said contactor device further including a generally sealed cabinet for said wire feeder and means for mounting said device in said generally sealed cabinet.

10. An electro mechanical contactor device in a wire feeder for an electric arc welder having a power source and a gun with a contact tip through which welding wire is fed and a weld cycle start trigger switch having a closed condition to initiate and hold a weld cycle and an open condition, said contactor device comprising: a power inlet lead connected to said power source, an output lead connected to said contact tip, a plurality of current branches between said input lead and said output lead with a mechanical contactor having an open condition and closed condition for opening and closing each of said branches, respectively, and a single solenoid operating said contactors in unison based upon the condition of said trigger switch, with a first position to close said contactors in unison when said trigger switch is shifted from said open condition to said closed condition and to hold said contactors closed when said trigger switch is in said closed condition;

said contactor device further including an air circulating device adjacent said contactors of said current branches, said circulating device having means for directing air over said contactors.

11. An electro mechanical contactor device in a wire feeder for an electric arc welder having a power source and a gun with a contact tip through which welding wire is fed and a weld cycle start trigger switch having a closed condition to initiate and hold a weld cycle and an open condition, said contactor device comprising: a power inlet lead connected to said power source; an output lead connected to said contact tip, a current branch between said input lead and said output lead with a mechanical contactor having an open condition and closed condition for opening and closing said branch, respectively; a solenoid operating said contactor based upon the condition of said trigger switch with a first position to close said contactor when said trigger switch is shifted from said open condition to said closed condition and to hold said contactor closed when said trigger switch is in said closed condition; and, a temperature sensor associated with said branch, said sensor including a circuit to create a signal when the temperature of said branch exceeds a preset value and a circuit for blocking said solenoid from shifting to said first position upon creation of said signal.

12. An electro mechanical contactor device as defined in claim 11 wherein preset value is adjustable.

13. An electro mechanical contactor device as defined in claim 11 comprising a plurality of current branches between said input lead and said output lead and a plurality of corresponding mechanical contactors operated by said solenoid to concurrently close said plurality of contactors in unison when said trigger switch is shifted from said open condition to said closed condition and to hold said contactors closed when said trigger switch is in said closed condition.

14. An electro mechanical contactor device as defined in claim 13 comprising a plurality of temperature sensors individually associated with said plurality of current branches and coupled with said circuit, wherein said circuit is operable to create said signal when the temperature any of said branches exceeds said preset value.

15. An electro mechanical contactor device as defined in claim 13, wherein said plurality of current branches distribute current uniformly between said plurality of current branches when said plurality of contactors are closed.

16. An electro mechanical contactor device in a wire feeder for an electric arc welder having a power source and a gun with a contact tip through which welding wire is fed and a weld cycle start trigger switch having a closed condition to initiate and hold a weld cycle and an open condition, said contactor device comprising: a power inlet lead connected to said power source, an output lead connected to said contact tip, a plurality of current branches between said input lead and said output lead with a mechanical contactor having an open condition and closed condition for opening and closing each of said branches, respectively, and a single solenoid operating said contactors in unison based upon the condition of said trigger switch, with a first position to close said contactors in unison when said trigger switch is shifted from said open condition to said closed condition and to hold said contactors closed when said trigger switch is in said closed condition;
wherein said plurality of current branches distribute current uniformly between said plurality of current branches when said plurality of contactors are closed.

17. An electric arc welding system, comprising:
a power source;
a gun having a contact tip through which welding wire is fed;
a weld cycle start trigger switch operatively coupled with said gun and having a closed condition to initiate and hold a weld cycle and an open condition; and
an electro mechanical contactor device comprising:
a power inlet lead operatively coupled with said power source,
an output lead operatively coupled with said contact tip,
a plurality of current branches of generally equal conductivity and being individually electrically coupled between said input lead and said output lead,
a plurality of mechanical contactors corresponding to said plurality of current branches, said contactors individually having an open condition and a closed condition for opening and closing a corresponding one of said branches, respectively, and
a single solenoid operating all of said contactors in unison based upon the condition of said trigger switch, said solenoid having a first position to close said contactors in unison when said trigger switch is shifted from said open condition to said closed condition and to hold said contactors closed to distribute current from said power inlet lead to said output lead uniformly between said plurality of current branches when said trigger switch is in said closed condition.

* * * * *